United States Patent Office 3,283,132
Patented Nov. 1, 1966

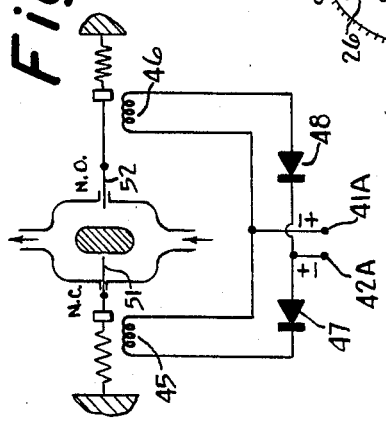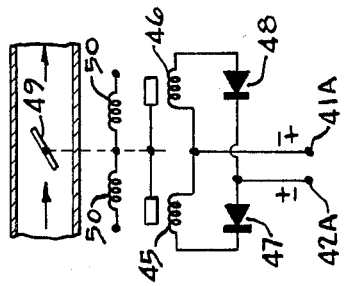

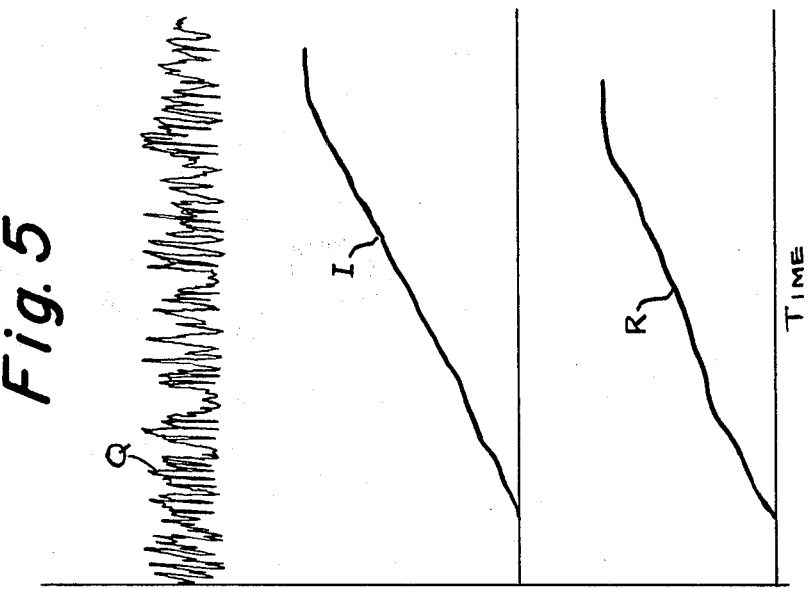
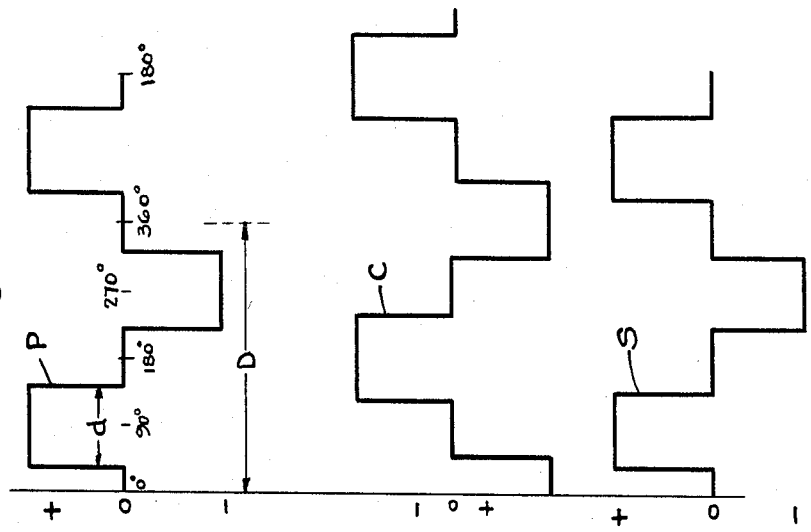

3,283,132
CORRELATION-ANALYSIS METHODS AND
APPARATUS
Kenneth W. Goff, Abington, and Charles W. Ross, Hatboro, Pa., assignors to Leeds and Northrup Company, Philadelphia, Pa., a corporation of Pennsylvania
Filed May 3, 1962, Ser. No. 192,173
17 Claims. (Cl. 235—181)

This invention relates to methods and apparatus for performing correlation analyses of the response of systems, including industrial processes and instrumentation, to determine characteristics of the system or of an input.

Prior to the present invention, it has been proposed to make correlation analyses by effecting sinusoidal perturbation of an input variable of a system-process and effectively multiplying the resultant response of an output variable of the system by a sinusoidal signal having the same frequency as the input perturbation. Theoretically, integration of the products of such multiplication affords a highly accurate measure of components of the system transfer function with respect to such variables. However, practical applications of such correlation analyses have been beset with problems making it difficult or impossible to attain high accuracy and have required cumbersome and expensive equipment. For example, it has proved to be most difficult to obtain a pure sinusoidal perturbation of an input variable because of the difficulty of reproducing a sinusoidal variation of position of an input control element even with a pure sine-wave signal; because of a non-linear relationship between sinusoidal variation of a perturbation signal and change in position of an input control element; and because of a non-linear relationship between the change in position of an input control element and the actual change of the input variable. Furthermore, if the perturbing signal is generated electronically, the range of frequencies cannot be extended to sufficiently low frequencies except with difficulty and at relatively great expense; if such signal is generated by a sine-cosine potentiometer, the equipment is costly and has proved to be quite unreliable particularly at the higher frequencies of operation. Also, at the low frequencies involved, it is difficult and expensive to effect pure sine-wave multiplication: also with the prior arrangements, it is difficult to obtain any selected phase-relation of the multiplying waves within a substantial range of adjustment.

Although other herein specified waveforms may be used, in the preferred methods and apparatus of the present invention, both the perturbing signal and the signal or signals used for multiplication are step-functions of time, such as square-waves, and preferably shaped square-waves having symmetrical half-waves of alternately opposite sense relative to a mean value. Waves of such shape may be produced simply and reproducibly with inexpensive and compact apparatus using periodically actuated switches and/or relays of electronic, mechanical or other type, which in practice have proved reliably to afford correlation analyses of high order of accuracy approaching that theoretically realizable with sinusoidal signals. The apparatus may be used for analyses of processes, systems or system components, generically herein termed systems for determination of their operational characteristics as a performance index for design or adjustment of control equipment to be used with them or as a measure of an unknown property or characteristic of a system input.

For a more detailed understanding of the invention, reference is made in the following description of preferred embodiments thereof to the accompanying drawings, in which:

FIG. 1 schematically illustrates a circuit diagram of a correlation analysis system;

FIG. 2 is a perspective view showing in simplified form the construction of various generators and their driving means included in the system of FIG. 1;

FIGS. 3A and 3B schematically illustrate two arrangements utilizing a square-wave signal to effect perturbation of a process input;

FIG. 4 shows waveforms of perturbing and multiplying signals provided by the apparatus of FIGS. 1 and 2;

FIG. 5 is an explanatory view showing curves referred to in discussion of the operation of the system of FIG. 1;

Figure 8:
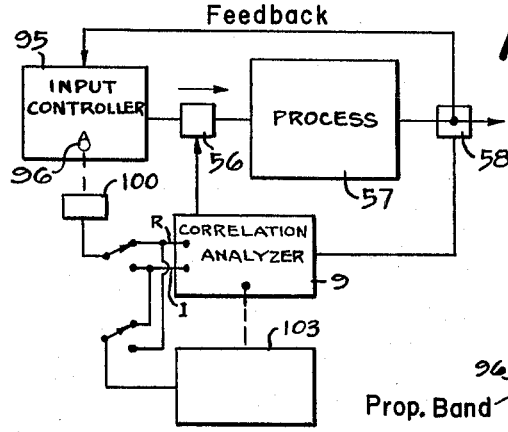
Figure 9:
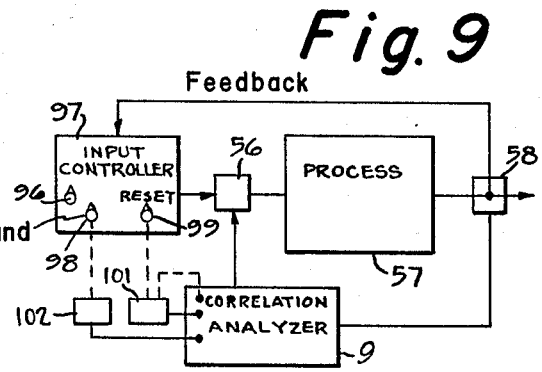

FIG. 8 schematically illustrates the correlation analyzer of preceding FIGURES as used in optimizing the control of a process; and FIG. 9 schematically illustrates the correlation analyzer of preceding figures as used in an adaptive control system.

Figure 1:
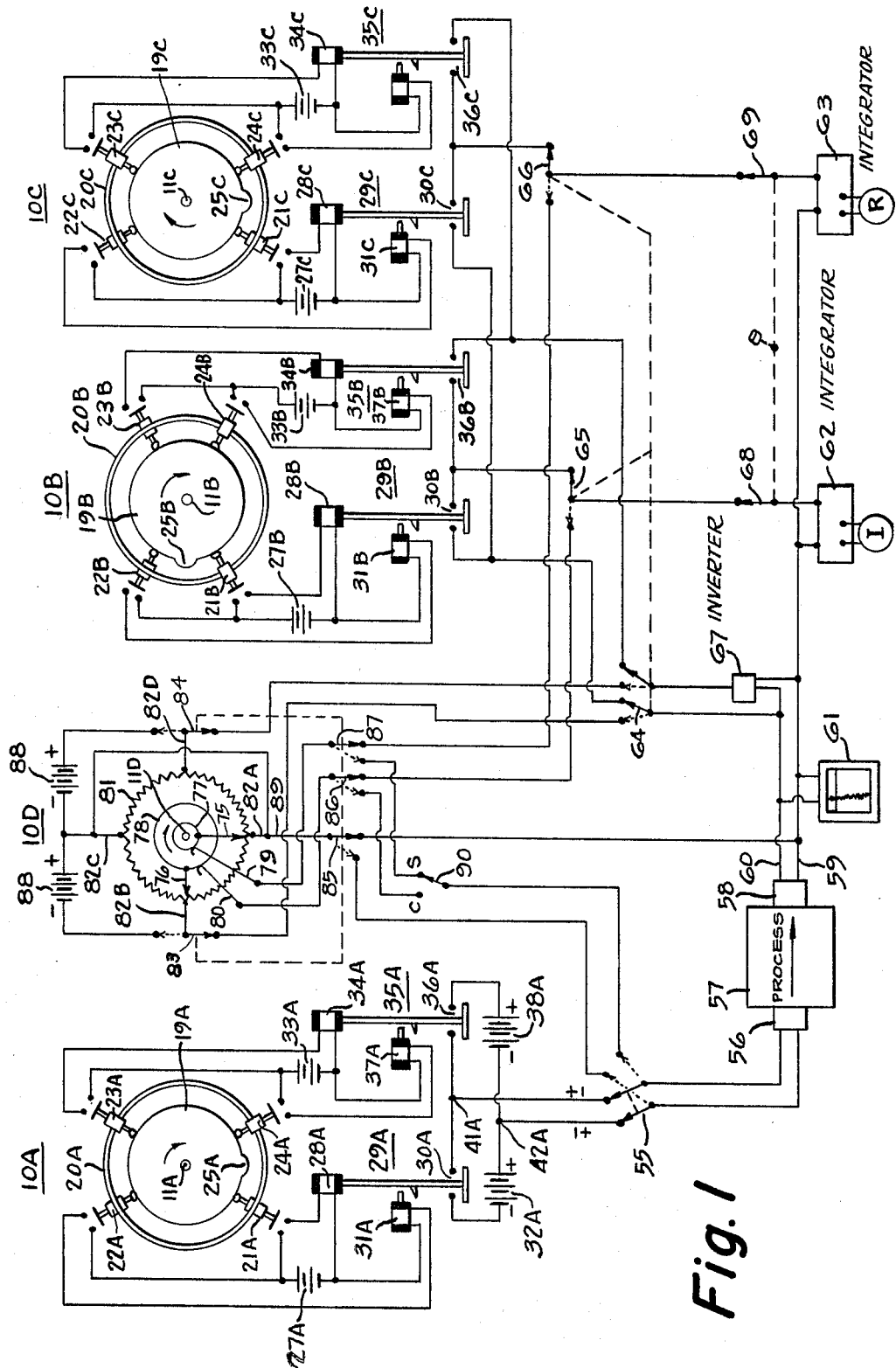

In the analyzer apparatus shown in FIGS. 1 and 2, the three generators 10A, and 10B and 10C are capable of producing square-waves of desired frequency within a wide range of low frequencies extending, for example, from 0.00025 cycle per second (c.p.s.) to 15 c.p.s. Because the three generators are similar, only one of them need be specifically described particularly since the corresponding elements of all three are identified by the same reference characters with a letter suffix identifying the related generator.

The shaft 11A of generator 10A (FIG. 2) is coupled to shaft 12 of motor 13 through a pair of bevel gears 14A–15A and a gear box 16A. The gear box is provided with a control knob 17A, or equivalent, for selecting a desired speed ratio between the speed of the motor shaft and the generator shaft. The motor 13 may be a synchronous motor to insure constancy of the speed of shaft 12 or it may be a variable-speed series motor with a speed control 18, affording constancy at any selected speed within a continuous wide range of speed. Speed control 18 may be of the type disclosed and claimed in copending application Serial No. 188,457, filed April 18, 1962.

The cam 19A attached to shaft 11A rotates within the relatively stationary frame 20A which provides a mounting for a plurality of switching units 21A–24A. Each of the switching units includes a movable cam-follower biased to engage the cam 19A and mechanically coupled to the movable contact structure of the switch. For each rotation of shaft 11A, the rise 25A of cam 19A engages the cam-follower of each of the switches 21A–24A and effects a brief closure of its normally-open contacts. The angular position of the cam rise 25A with respect to the shaft 11A is represented by that of a pointer 26, or equivalent also attached to shaft 11A. For the position shown in FIGS. 1 and 2, the pointer 26 indicates that generator 10A is at the 0° point of a cycle of the waveform it generates. At a preselected number of degrees beyond the 0° point, the cam 19A effects momentary closure of switch 21A to effect energization of the operating coil 28A (FIG. 1) of a latching relay 29A from a suitable current source exemplified by battery 27A. The normally-open contacts 30A of the relay are thus closed to initiate the beginning of a positive current pulse at output terminals 41A, 42A of the generator. At a preselected number of degrees in advance of the 180° point, the cam 19A effects momentary closure of switch 22A to effect energization of the release coil 31A of relay 29A from source 27A, whereupon the contacts 30A of the relay return to their normally-open position to terminate the positive output pulse supplied by battery 32A or equivalent source of direct current.

At a preselected number of degrees beyond the 180° point, the cam 19A effects momentary closure of switch 23A to effect energization from battery 33A or equivalent current source of the operating coil 34A of latching relay 35A. The normally-open contacts 36A of this relay are thus closed to initiate the beginning of a negative current pulse at output terminals 41A, 42A of generator 10A. At a preselected number of degrees in advance of the 360° or 0° point, cam 19A effects momentary closure of switch 24A to effect energization of the release coil 37A of relay 35A from source 33A, whereupon the contacts 36A of that relay are returned to their normally-open position to terminate the negative output pulse supplied by battery 38A, or equivalent direct-current source, to the output terminals 41A, 42A of generator 10A.

Thus, for each revolution of shaft 11A, the generator 10A produces at its output terminals 41A, 42A one cycle of a shaped square-wave, exemplified by wave P of FIG. 4, having symmetrical half-waves alternately of opposite polarity. The square-wave signal provided by generator 10A may be utilized to perturb an input variable of practically any process system. If the input is other than electrical in nature, it will be necessary to interpose a suitable transducer to convert the generator output signal to one suited to vary the particular input to be perturbed.

For example to effect flow variation by a valve 49, as shown in FIG. 3A, the output terminals 41A, 42A of generator 10A may be connected to the solenoid motors 45, 46, each in series with one of the rectifiers 47, 48. For the positive half-waves (terminal 42A positive and terminal 41A negative), the rectifier 47 is conductive to energize motor 45 which thereupon swings valve 49 to maximum flow position. For the negative half-waves (terminal 41A positive and terminal 42A negative), the rectifier 48 is conductive to energize motor 46, which accordingly rotates valve 49 to minimum flow position. In the intervals of the shaped square-wave P (FIG. 4), for which the output terminals 41A, 42A are at zero difference of potential, both motors 45, 46 are deenergized and the valve 49 is in an intermediate flow position determined by its biasing springs 50. In most cases, the flow controlled by valve 49 is in a by-pass path for a valve (not shown) regulating the main stream of the process input to be perturbed, and accordingly the result of actuation of the valve 49, as described above, is periodically to increase and decrease the total flow of the process input variable by fixed steps.

In the generally similar arrangements of FIGS. 3B, one of the valves 51, 52 is normally open and the other is normally closed. The flow paths they control are in parallel to a valve (not shown) which regulates the main stream of the input to be perturbed. For the positive half-waves of the perturbing signal, the rectifier 47 passes current to solenoid motor 45 to open the normally-closed valve 51. With valve 52 already open, the total flow of the input variable is thus increased by a fixed increment. For the negative half-waves of the perturbing signal, the rectifier 48 passes current to solenoid motor 46 to close the normally-open valve 52. With valve 51 already closed, the total flow of the input variable is thus decreased by a fixed increment. In the intervals of the square-shaped wave P for which the output terminals 41A, 42A are at zero difference of potential, both motors 46, 45 are respectively in their normally-open and normally-closed positions with the total flow of the input variable at the mean value about which it is perturbed by the excitation signal.

Reverting to FIG. 1, it will now be understood that with the excitation-selection switch 55 in the position shown, the square-wave signals P provided by the generator 10A may be applied to a transducer 56 so as to increase and decrease an input variable of the system 57 as a corresponding step function of time.

The resulting response of an output variable of the system-process 57, if not itself of electrical nature, is converted to an electrical signal by transducer 58, such as a thermocouple, conductivity cell or other condition-responsive device suited to the particular output variable of a given process. In any event, the output response as appearing on lines 59, 60 is an electrical signal representative of the response of the system to the perturbation of its input as modified by its operational characteristics and by process "noise." As evident from the curve Q of FIG. 5, which represents the recorded response of a system to square-wave perturbation of its input for the time interval of many cycles, the masking effect of the system noise may be so great that inspection of the curve Q yields no information related to the transfer function of the system. The same output signal, however, can be utilized as now described to obtain the cross-correlation functions I and R of FIG. 5 from which the system gain and system phase-lag can be accurately derived.

To abstract from the output signal Q (FIG. 5) a frequency component of interest, the output signal is effectively multiplied by that frequency and averaged or integrated. To obtain R and I, two multiplications are performed, one by a signal in phase with said frequency component signal and the other in quadrature with said frequency component. In the averaged or integrated results of such multiplication, the "noise" components of the system-response signal are significantly reduced.

Considering the transducer 58 (FIG. 1) as the source of a direct-current response signal, one of its terminals is connected by output line 59 to one terminal of each of the two averaging or integrating devices 62, 63. Such devices may be of types per se known, such as resistive-capacitive low-pass filters, operational amplifiers with capacitance in the feedback line, and electro-mechanical integrators, whose output is the weighted average of the selected frequency component of the system-response signal. In either event the weight remains constant or varies inversely with elapsed time. With the switches 64 and 65 closed in the position shown, connection of the other terminal of integrator 62 to the other output line 60 is completed upon closure of the normally-open contacts 30B of relay 29B or of the normally-open contacts 36B of relay 35B through inverter 67. These two relays are part of the generator 10B and function as described in connection with generator 10A except for a phase-advance of 90°. With switches 64 and 66 closed in the position shown, connection of the other terminal of integrator 63 to output line 60 is completed upon closure of the normally-open contacts 30C of relay 29C or of the normally-open contacts 36C of relay 35C through inverter 67. These relays are part of the generator 10C and operate as described in connection with generator 10A, the generators 10A and 10C operating in phase.

Thus, for each positive pulse of the perturbation signal P, the contacts 30C of relay 29C of generator 10C are closed for a corresponding interval and the resulting in-phase response signal of the system is introduced into and averaged by the integrator 63; for each negative pulse of the input perturbation signal, the contacts 36C of relay 35C of generator 10C are closed for a corresponding interval and the resulting in-phase response of the system as reversed in polarity by the inverter 67, such as an operational amplifier with unity gain, is introduced and averaged by the integrator 63. In effect, the response of the system to the square-wave perturbation of its input is effectively multiplied by an in-phase square-wave signal S (FIG. 4) and applied to the integrator 63 to provide the output R (FIG. 5).

Since the generator 10B operates in phase-quadrature to the excitation generator 10A, the contacts 30B of relay 29B are periodically closed for positive half-wave intervals symmetrical with respect to the 360° points of the perturbation wave P and the contacts 36B of relay 35B are periodically closed for negative half-wave intervals symmetrical with resect to the 180° points of the perturbation wave P. In effect, the response of the system to the square-wave perturbaiton of its input is effectively multiplied by a quadrature square-wave signal C (FIG. 4) produced by generator 10B and applied to the integrator 62 to provide the output I (FIG. 5).

The switches 68 and 69 respectively in circuit with the integrators 62 and 63 are generally not closed until after the perturbing signal has been applied for an interval sufficiently long for system transients to die away and are maintained closed for an integer number of half-waves of the multiplication signal. For example, the switches, if closed as the pointer 26 passes through 0 degrees, are opened as pointer 26 passes through either the 0° or 180° point. Thus, the integration of the system response is for an integer number of half-waves of the perturbation signal. This timing is effective to remove unwanted frequencies produced by the multiplication operation.

For the moment asuming that the waves P, C and S are "unshaped" square-waves—i.e., with positive and negative pulses of 180° duration—the terminal values of R and I may be expressed as (1)
$$R = \frac{8AT}{\pi^2 T_i}\left\{|G_p(j\omega)| \cos \theta_p(j\omega) + \frac{1}{9}|G_p(j3\omega)| \cos \theta_p(j3\omega) + \frac{1}{25}|G_p(j5\omega)| \cos \theta_p(j5\omega) + \ldots\right\}$$

(2)
$$I = \frac{8AT}{\pi^2 T_i}\left\{|G_p(j\omega)| \sin \theta_p(j\omega) + \frac{1}{9}|G_p(j3\omega)| \sin \theta_p(j3\omega) + \frac{1}{25}|G_p(j5\omega)| \sin \theta_p(j5\omega) + \ldots\right\}$$

where $T$ = correlation time interval
$T_i$ = time constant of integrators
$A$ = peak value of P
$\omega$ = fundamental frequency of P
$|G_p(j\omega)|$ = magnitude of system gain
$\theta_p(j\omega)$ = system phase-lag It is to be noted that these values include odd harmonic terms of the fundamental frequency of the perturbing signal. The effect of these harmonic terms on the values of R and I can be substantially reduced by suitably "shaping" the square-waves. For example, the third harmonic can be reduced to 0 by setting the switches of the generators so that the pulses of the positive half-waves extend from 30° to 150° of the cycle and the negative half-waves extend from 210° to 330° of the cycle. Also, the errors due to the third and fifth harmonics can be attenuated respectively to approximately 0.11 and 0.3 of their unshaped square-wave value by setting the switches of the generators so that the positive pulses extend from 24° to 156° of the cycle and the negative pulses extend from 204° to 336° of the cycle. These and other shaped square-waves reducing selected harmonics can be derived from the formula (3)
$$\frac{C_n}{C_1} = \frac{1}{n}\frac{\sin \frac{n\pi d}{D}}{\sin \frac{\pi d}{D}}$$

where $C_n/C_1$ is the relative magnitude of the $n$th harmonic to the first harmonic or fundamental frequency component;

$d/D$ is the closure time for one set of contacts relative to the period of the fundamental frequency.

The amplitude and phase-characteristics of the system under test for a given fundamental measuring frequency can be derived, to a very close approximation, from Equations 1 and 2 from the following relationships:

(4)
$$G_p(j\omega) = \frac{K}{AT}\sqrt{R^2 + I^2}$$

where $K$ = instrument constant for given waveform (5)
$$\theta_p(j\omega) = \tan^{-1}\frac{I}{R}$$

With its switches 21A, 24A set at the 0 point and its switches 22A and 23A set at the 180° point, the generator 10A produces "unshaped" square-waves as a perturbation signal which in addition to the fundamental frequency component has substantial third and fifth harmonic components, see Equations 1 and 2. However, with the switches of the multiplier generators 10B and 10C set as above described to produce "shaped" square-waves, the resulting third and fifth harmonic components of the process response may be reduced. With the switches of generators 10B and 10C also set to produce "unshaped" square-waves, the values of I and R as read out by the integrators 62 and 63 will have a different scaling or instrument factor K (Equation 4) in the derivation of system gain.

With the switches of generator 10A set to produce "shaped" square-waves as the perturbation signal and with the switches of generators 10B and 10C set to produce "unshaped" square-waves, the terminal values of I and R as read out by the integrators 62 and 63 will have a still different scaling or instrument factor K (Equation 4) for derivation of system gain.

With the switches of generator 10A set to 0° and 180° as described above to produce unshaped square-waves, the alternate half-waves of the perturbing signal were of positive and negative polarity and symmetrical about a mean value of zero. For unshaped square-waves, both the switching and input transducers may be simplified to produce and utilize excitation signals having two levels, one of which is zero, and which is symmetrical about the mean value of those levels. In such case, either pair of the switches and the associated relay and current sources may be omitted in generator 10A and the associated input transducer 56 need be sensitive only to magnitude, rather than magnitude and polarity of the generator output and in a transducer arrangement such as shown in FIG. 3A or 3B one solenoid motor and both rectifiers would be omitted.

With the switches 64, 65 and 66 thrown to dotted-line position (FIG. 1), the square-wave generators 10B, 10C are replaced in the input circuits of integrators 62, 63 by the sine-cosine generator 10D now described.

Referring to FIGS. 1 and 2, the shaft 11D of generator 10D is coupled to the shaft 12 of motor 13 through bevel gears 14D, 15D and the gear box 16D. The control knob 17D of the control box may be set to select a desired speed ratio between the speeds of shafts 12 and 11D. The slidewire brushes 75, 76 are respectively attached in 90° relationship to sleeves 77, 78 which in turn are fastened to and electrically insulated from the generator shaft 11D. The sleeves 77, 78 are continuously engaged by the collector brushes 79, 80 respectively connected to the switches 87 and 86. The free ends of the slidewire brushes 75, 76 have sweeping contact with the inner turns of the relatively stationary slidewire 81 which has four taps 82A, 82B, 82C, 82D equally spaced about its circumference. The taps 82A and 82C are both connected to the mid-point of the direct-current source 88 and to the movable contact of switch 85. The taps 82B and 82D are respectively connected to the movable contacts of switches 83 and 84. The slidewire conductor may be wound to afford equal changes of resistance for equal angular changes of brush movement to provide per revolution of each brush a triangular waveform. Alternately, the slidewire resistance may be "tapered" in manner per se known to afford per revolution of each brush a full-wave sinusoidal variation.

In FIG. 1, the slidewire taps 82A, 82C are connected via switch 85 to the common input terminals of integrators 62, 63: tap 82B of the slidewire 81 is connected via switches 83 and 64 (the latter in dotted-line position) to output line 60 from transducer 58; tap 82D of the slidewire 81 is connected via switches 84, 64 (the latter in dotted-line position) and inverter 67 to output line 60; the slidewire brush 75 is connected via switches 87, 66 (the latter in dotted-line position) and 69 to the other input terminal of integrator 63; and slidewire brush 76 is connected via switches 86, 65 (the latter in dotted-line position) and 68 to the other input terminal of integrator 62.

The system response signal as applied to integrator 63 is effectively multiplied by a sine-wave of the fundamental frequency of the perturbing signal, and as applied to integrator 62 is effectively multipled by a cosine wave of the fundamental frequency of the perturbing signal. Such sine-cosine multiplication of the response signal can be utilized with the generator 10A set or constructed to produce square-waves either of shaped or unshaped waveform.

The generator 10D may also be used to produce sinusoidal (or triangular) perturbing signals with the generators 10B, 10C set or constructed to produce square-waves of either shaped or unshaped waveform.

To that end, the multiplier-mode-selection switches 64, 65 and 66 are thrown to their full-line positions (FIG. 1) to connect the square-wave generators 10B, 10C in circuit with integrators 62, 63 and the system-output transducer 58. The excitation-mode-selector switch 55 is thrown to dotted-line position (FIG. 1) to connect the input-perturbation transducer 56 for excitation by the output of generator 10D. With the switches 83, 84 thrown to their dotted-line positions, the D.C. source 88 is connected in series between the taps 82B, 82D of slidewire 81 with its mid-tap connected to taps 82A and 82C of the slidewire. Thus each of the available output voltages of generator 10D as measured between the common conductor 89 and one or the other of the continuously rotating slidewire brushes 75, 76 varies as a sinusoidal (or triangular) function of time with symmetrical half-waves which are alternately of opposite polarity. Either the sine-wave output or the cosine-wave output of generator 10D may be selected as the input perturbation signal by throwing the switch 90 for connection to slidewire brush 75 or slidewire brush 76.

To avoid wear of the expensive slidewire 81 when the generator 10D is not used in testing, the control knob 17D (FIG. 2) may be set to an off position for which the shaft 11D is decoupled from the motor shaft 12. When shaft 11D is to be recoupled, the proper phasing of generator 10D with respect to the square-wave generators 10B, 10C can be reestablished by first setting shaft 11D so that the position of its pointer 92 corresponds with the position of pointer 26. Since at most, the analyzer of FIG. 2 uses only one slidewire instead of three, it is considerably less expensive and considerably more reliable than one using slidewires to produce both the excitation and response-multiplier waveforms. Moreover because for reasons previously herein stated, the theoretical advantages of using pure sine-waves for the input perturbing signal are practically unrealizable in practice so that the generator 10D may be omitted and equally useful correlation analyses performed with the simpler, more reliable, and less expensive square-wave generators 10A, 10B, 10C as previously described.

For the fundamental frequency or first harmonic analysis thus far described, the controls of the gear boxes of the generators in use are set to provide the same speed ratio of the generator shaft to the motor shaft 12. For higher order harmonic analysis, the speed settings are such that the multiplier signals have a fundamental frequency which is the selected harmonic of the perturbing signal.

The quadrature-multiplier signals may be shifted in phase relative to the perturbing signal to obtain, for example, a zero output I from the integrator 62 with the result that the output R of integrator 63 is now a unique measure of gain $G_p$ (Equation 4) and the shift angle is a direct measure of phase-angle $\theta_p$ (Equation 5). Such shift in phase, without disturbance of the quadrature relationship between the two multiplier signals, may be effected in various ways. For example, the slidewire 81 of generator 10D may be angularly shifted with respect to its brushes 75, 76; the switch mount 20A or the switch mounts 20B, 20C may be shifted relative to their associated switches for like purpose.

The correlator apparatus above described may be used for testing or analyzing the operation of a process or method or components thereof; for incorporation within a measuring instrument to provide its output or outputs; and for addition to a control system for modifying its operation.

Figure 6A:
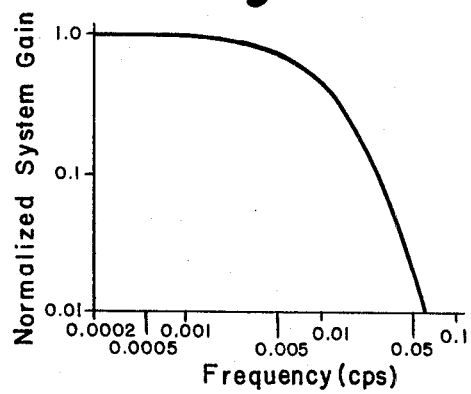
FIGS. 6A and 6B show gain and phase-lag curves of a process system by using the correlation analyzer of FIGS. 1 and 2.
Figure 7A:
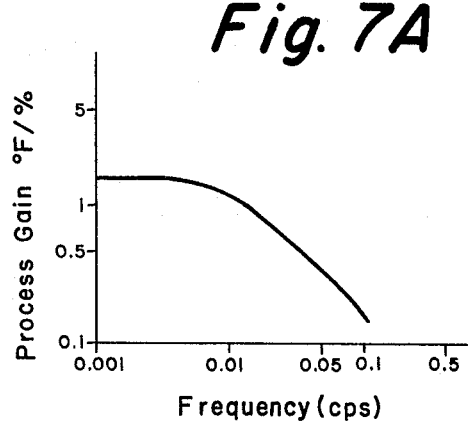
FIGS. 7A and 7B are curves similar to FIGS. 6A and 6B but for a large industrial process.
Figure 6B:
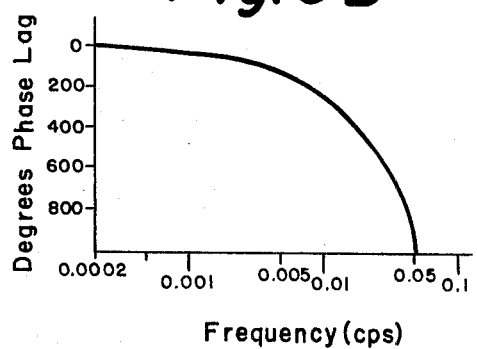
Figure 7B:
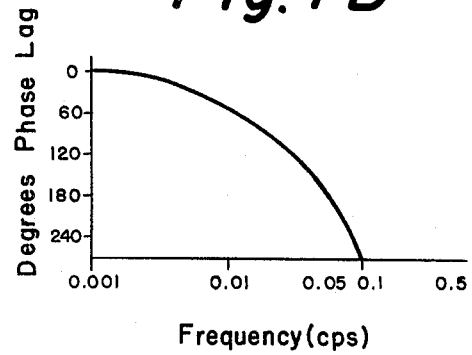

As employed for testing or analyzing a system or process, the correlator is used in a series of concurrent or sequential tests to determine I and R for a corresponding number of different perturbation frequencies. Then from the derived gain and phase-shift values may be plotted gain vs. frequency and phase-lag vs. frequency, as exemplified by the curves of FIGS. 6A, 6B and 7A, 7B. The curves of FIGS. 6A, 6B relate to tests made on a thermal conductivity gas analyzer in which the gas composition was perturbed by alternately introducing known amounts of two different gases by means of solenoid valves operated from the generators of the analyzer. The curves of FIGS. 7A, 7B relates to tests made on a large-scale industrial process in which the perturbed input was the speed of an induced-draft fan and the process output was gas-temperature as measured by a high-speed thermocouple. A square-wave perturbation signal was applied to the draft-fan controller.

Such gain and phase-shift curves may be used in obtaining an understanding of a process or system as an aid in the design or adjustment of a control system therefor, in the evaluation of a change in the components or operating level of the system or process, or in the construction of a simulation of an actual system for further experimentation without interruption of operation of an actual system.

The correlator of FIG. 1 may be incorporated in and become a functioning part of an instrument itself. For example, the block 57 of FIG. 1 may be a column of a chromatograph, the transducer 56 may control flow of an unknown gas to the column, transducer 58 may be a conventional detector such as a thermal-conductivity cell, and the outputs of the integrators 62, 63 are applied to a computing network which affords a read-out of the gas composition, this network together with the correlation equipment described forming a chromatograph instrument. For analysis of complex compositions, additional detectors and additional related circuits are required.

As exemplary of the use of the correlator in control of a process having a relation between the perturbed input and an output for which there is a point of inversion of slope, reference is made to FIG. 8. The perturbation signal may be applied to a transducer 56 or to the set-point control element 96 of a controller 95. The I or R output of the correlator 9 may be applied, as through an electromechanical transducer 100, to adjust the set-point element 96 until the inversion point of the aforesaid relation is reached, at which time the selected output I or R is zero. In systems in which the phase-relation of the output to the input shifts with change of input level, the phase of the multiplier signal relative to the perturbation signal is set, by means explained above, to insure that there is no reversal in polarity of the selected signal except at the aforesaid inversion point. This may be effected automatically by the other output as applied to an electromechanical transducer 103 for relatively adjusting the switch mounts or slidewire body until said other output is reduced to zero. In systems not having a controller 95, the transducer 100 may be used to adjust the input level to the system. In systems in which the quantity or parameter, such as heat rate or efficiency, that is to be optimized is not directly available, it may be computed from measurement of a plurality of parameters and applied to the multiplying circuits of the correlator 9.

In FIG. 9, an input of the process-system 57 is regulated by a controller 97 having an element 98 for changing its proportional-band action and an element 99 for changing its reset action. The R and I outputs of the analyzer 9 are respectively utilized to adjust the elements 98 and 99 of the controller. The transducer 101 responsive to I output concurrently adjusts the reset-control element 99 and the phase relation between the perturbing signal and the quadrature multiplier signals until the I is reduced to zero. The transducer 102 responds to the R output to effect a proportional change in the setting of the proportional-band element 98. Instead of applying it to the transducer 56, the perturbing signal may be applied to the set-point element 96 of controller 97 and the signal applied to the correlator 9 may be supplied either from transducer 58 or transducer 56.

It shall be understood that the invention is not limited to the specific methods and apparatus described but also comprehends modifications and equivalents thereof within the scope of the appended claims.

What is claimed is:

1. A method of determining a cross-correlation function of a system having an input and an output which comprises producing two periodic signals of constant fundamental frequency which are harmonically related, each consisting of symmetrical half-waves of alternately opposite sense and at least one of said signals having non-sinusoidal half-waves, applying one of said signals to effect perturbation of said input of said system, producing a third signal representative of the actual resulting changes of said output of the system, effectively multiplying said third signal by the other of said two signals, and averaging the multiplication products of said third signal and the other of said two signals.

2. A method of determining a cross-correlation function of a system having an input and an output which comprises producing two periodic signals of constant fundamental frequency which are harmonically related, each consisting of symmetrical half-waves of alternately opposite sense and at least one of said signals having half-waves which are a step-function of time, applying one of said signals to effect perturbation of said input of said system, producing a third signal representative of the actual resulting changes of said output of the system, effectively multiplying said third signal by the other of said two signals, and averaging the multiplication products of said third signal and the other of said two signals.

3. A method of determining a cross-correlation function of a system having an input and an output which comprises producing two periodic signals of constant fundamental frequency which are harmonically related, each consisting of symmetrical half-waves of alternately opposite sense and at least one of said signals having half-waves of rectangular form, applying one of said signals to effect perturbation of said input of said system, producing a third signal representative of the actual resulting changes of said output of the system, effectively multiplying said third signal by the other of said two signals, and averaging the multiplication products of said third signal and the other of said two signals.

4. A method of determining a cross-correlation function of a system having an input and an output which comprises producing two periodic signals which are harmonically related, each having symmetrical half-waves of alternately opposite sense and at least one of said signals having half-waves of rectangular form shaped to reduce at least one harmonic of the fundamental signal frequency, applying one of said signals to effect perturbation of said input of said system, producing a third signal representative of the actual resulting changes of said output of the system, effectively multiplying said third signal by the other of said two signals, and averaging the multiplication products of said third signal and the other of said two signals.

5. A method of determining a cross-correlation function of a system having an input and an output which comprises producing two periodic signals of constant fundamental frequency which are harmonically related, each consisting of symmetrical half-waves of alternately opposite sense and at least one of said signals having non-sinusoidal half-waves, applying the non-sinusoidal signal to effect perturbation of said input of the system, producing a third signal representative of the actual resulting changes of said output of the system, effectively multiplying said third signal by the other of said two signals, and averaging the multiplication products of said third signal and the other of said two signals.

6. A method of determining a cross-correlation function of a system having an input and an output which comprises producing two periodic signals of constant fundamental frequency which are harmonically related, each consisting of symmetrical half-waves of alternately opposite sense and at least one of said signals having half-waves which are a step-function of time, applying one of said signals to effect perturbation of said input of the system, producing a third signal representative of the actual resulting changes of said output of the system, periodically sampling said third signal by said one of said two signals to provide multiplication products thereof, and averaging said multiplication products.

7. A method of determining a cross-correlation function of a system having an input and an output which comprises producing two signals of the same constant fundamental frequency, each of said signals consisting of symmetrical half-waves which are a step-function of time and alternately of opposite polarity, applying one of said signals to effect perturbation of said input of the system, producing a third signal representative of the actual resulting changes of said output of the system, periodically sampling said third signal by the other of said two signals to produce multiplication products, and averaging said multiplication products.

8. A method of determining a cross-correlation function of a system having an input and an output which comprises producing two square-wave signals of constant fundamental frequency in fixed phase relation and each consisting of symmetrical half-waves of alternately opposite polarity, applying one of said signals to effect perturbation of said input of the system, producing a third signal representative of the actual resulting changes of said output of the system, periodically sampling said third signal by the other of said two square-wave signals to produce multiplication products, and averaging said multiplication products.

9. A method of determining the gain and phase-lag characteristics of a system having an input and an output which comprises producing three periodic signals which are harmonically related, each having symmetrical half-waves of alternately opposite sense and at least two of said signals being in phase-quadrature and having half-waves which are a step-function of time, applying one of said signals to effect perturbation of said input of the system, producing a fourth signal representative of the actual resulting changes in output of the system, periodically sampling said fourth signal by one of said two signals which is in phase with the perturbing signal to produce in-phase function multiplication products, periodically sampling said fourth signal by the other of said two signals which is in phase-quadrature with the perturbing signal to produce quadrature-function multiplication products, and integrating said in-phase function multiplication products and said quadrature-function multiplication products for an integer number of half-waves of the perturbing signal respectively to produce two cross-correlation functions R and I whose relation to the gain $G_p$ and phase-lag $\theta_p$ of the system is closely approximated by the equations $$G_p = \frac{K}{AT}\sqrt{R^2+I^2}$$

$$\theta_p = \tan^{-1}\frac{I}{R}$$

where $T$ = correlation time interval
$K$ = test constant
$A$ = constant of perturbing signal.

10. A method of optimizing the operation of a process-system having a regulated input which comprises producing two periodic harmonically related signals each having symmetrical half-waves of alternately opposite senses and at least one of said signals having half-waves which are a step-function of time, applying one of said signals to effect perturbation of the regulated input of said system, producing a third signal representative of the actual resulting changes of an output of said system, effectively multiplying said third signal by the other of said two signals to produce multiplication products, averaging said multiplication products to produce a control signal, and applying said control signal to vary the regulated input in sense and to extent for which said control signal effectively becomes zero.

11. A method of optimizing the operation of a process-system having a regulated input which comprises producing two periodic harmonically related signals each having symmetrical half-waves which are a step-function of time and alternately of opposite polarity, applying one of said signals to effect perturbation of the regulated input of said system, producing a third signal representative of the actual resulting changes of an output of said system, effectively multiplying said third signal by the other of said two signals to produce multiplication products, averaging said multiplication products to produce a control signal, and applying said control signal to vary said regulated input in sense and to extent for which said control signal effectively becomes zero.

12. In the operation of a process-system having an input regulated by a controller having a variable reset-control and a variable proportional-band control, a method of adaptive control which comprises producing three periodic harmonically related signals each having symmetrical half-waves of alternately opposite senses, applying one of said signals to effect perturbation of the regulated input of said system, producing a fourth signal representative of the resulting actual changes of an output of said system, effectively multiplying said fourth signal by the second and third of said three signals which are in phase-quadrature to obtain in-phase and phase quadrature correlation functions, adjusting the phase relation between the first and third signals to reduce the quadrature correlation function to zero and correspondingly adjusting the reset-control of said controller, and adjusting the proportional-band control of said controller in accordance with the in-phase correlation function.

13. An analyzer for determining a cross-correlation function of a system having an input and an output and comprising; two means for respectively producing two periodic harmonically related signals, each consisting of symmetrical half-waves of alternately opposite sense and at least one of them consisting of non-sinusoidal half-waves, at least one of said two means comprising switching means, means for applying one of said signals to effect perturbation of said input of said system, means for producing a third signal representative of the actual resulting changes of said output of the system, means for effectively multiplying said third signal by the other of said two signals, and means for averaging the multiplication products of said third signal and the other of said two signals.

14. An analyzer for determining a cross-correlation function of a system having an input and an output and comprising; two switching means for respectively producing two periodic harmonically related signals, each consisting of symmetrical half-waves of alternately opposite sense and at least one of them consisting of non-sinusoidal half-waves, a first transducer means in circuit with one of said switching means for applying one of said signals to perturb said input of the system, a second transducer means for producing a third signal representative of the actual resulting changes of said output of the system, and averaging means to which the output of said second transducer means is applied, under control of the other of said switching means, to produce a signal representative of said cross-correlation function.

15. An analyzer for determining two cross-correlation functions of a system having an input and an output and comprising; a first switching means periodically operated at constant frequency to produce a signal consisting of symmetrical half-waves of alternately opposite sense, a first transducer means in circuit with said first switching means for applying said signal to perturb said input of the system, a second transducer means for producing a second signal representative of the actual resulting changes of said output of the system, second and third switching means periodically operated in phase-quadrature to each other and in harmonic relation to said first switching means, a first averaging means whose output, under control of said second switching means, is applied to said second transducer means to produce a signal representative of one of said cross-correlation functions, and a second averaging means whose output, under control of said third switching means, is applied to said second transducer means to produce a signal representative of the other of said cross-correlation functions.

16. An analyzer for optimizing the operation of a process-system having a regulated input and comprising; a first switching means periodically operated to produce a signal consisting of symmetrical non-sinusoidal half-waves of alternately opposite sense, a first transducer means controlled by said first switching means for applying said signal to perturb said regulated input of the system, a second transducer means for producing a second signal representative of the actual resulting changes of an output of the system, a second switching means periodically operated in fixed phase relation to said first switching means, and an averaging means to which the output of said second transducer means is applied, under control of said second switching means to, produce a control signal for varying said regulated input in sense and to extent tending to reduce said control signal to zero.

17. An analyzer for automatically varying the reset and proportional-band settings of a controller which regulates an input of a process-system and comprising; a first switching means periodically operated to produce a signal of constant fundamental frequency and consisting of symmetrical half-waves of alternately opposite sense, a first transducer means controlled by said first switching means for applying said signal to perturb said regulated input of the system, a second transducer means for producing a second signal representative of the actual resulting changes of an output of the system, second and third switching means periodically operated in phase-quadrature to each other and in first harmonic relation to said first switching means, a first averaging means whose output, under control of said second switching means, is applied to said second transducer means to produce a first control signal for simultaneously shifting the reset-setting of said controller and the phases of said second and third switching means relative to the phase of said first switching means to reduce said first control signal to zero, and a second averaging means whose output, under control of said third switching means, is applied to said second transducer means to produce a second control signal for shifting the proportional-band setting of said controller.

References Cited by the Examiner

UNITED STATES PATENTS

| | | | |
|---|---|---|---|
| 2,840,308 | 6/1958 | Van Horne | 235—181 |
| 3,024,994 | 3/1962 | Buland et al. | 235—181 |
| 3,032,715 | 5/1962 | Frye | 324—78 |
| 3,070,301 | 12/1962 | Sarnoff | 235—151 |
| 3,103,009 | 9/1963 | Baker | 325—474 XR |
| 3,134,896 | 5/1964 | Briggs | 235—181 |

OTHER REFERENCES

Anderson et al., "A Self-adjusting System for Optimum Dynamic Performance," IRE National Convention Record, Part 4 (1958), pp. 182–190.

Mishkin et al. Adaptive Control Systems, McGraw-Hill (1961), pp 334–339.

Truxal, Control System Synthesis, McGraw-Hill (1955), pp. 437–438.

MALCOLM A. MORRISON, *Primary Examiner.*

I. KESCHNER, C. L. WHITHAM, *Assistant Examiners.*